(12) United States Patent
Pare

(10) Patent No.: US 8,668,219 B1
(45) Date of Patent: Mar. 11, 2014

(54) BICYCLE THRUST APPARATUS

(76) Inventor: Robert E. Pare, Bow, WA (US)

( * ) Notice: Subject to any disclaimer, the term of this patent is extended or adjusted under 35 U.S.C. 154(b) by 267 days.

(21) Appl. No.: 13/169,763

(22) Filed: Jun. 27, 2011

Related U.S. Application Data

(60) Provisional application No. 61/360,765, filed on Jul. 1, 2010.

(51) Int. Cl.
*B62J 1/28* (2006.01)
*B62M 1/00* (2010.01)

(52) U.S. Cl.
CPC .... *B62J 1/28* (2013.01); *B62M 1/00* (2013.01)
USPC ............... 280/288.4; 280/290; 297/215.12

(58) Field of Classification Search
USPC ................... 280/220, 288.4, 290, 304.4; 297/215.11, 215.12
See application file for complete search history.

(56) References Cited

U.S. PATENT DOCUMENTS

| | | | | |
|---|---|---|---|---|
| 482,271 | A * | 9/1892 | Openshaw et al. | 280/290 |
| 553,722 | A | 1/1896 | Prall | |
| 615,715 | A * | 12/1898 | Killen | 297/371 |
| 635,683 | A * | 10/1899 | Herman | 280/290 |
| 636,108 | A * | 10/1899 | Blackman | 280/290 |
| 636,222 | A * | 10/1899 | Killen | 297/375 |
| 638,861 | A * | 12/1899 | Bean | 280/290 |
| 735,573 | A * | 8/1903 | Oleszkiewicz | 280/215 |
| 3,879,087 | A | 4/1975 | Russo | |
| 4,363,516 | A | 12/1982 | Braly | |
| 6,086,079 | A * | 7/2000 | Farina | 280/261 |
| 6,206,399 | B1 | 3/2001 | Schnitzenbaumer | |
| 6,244,611 | B1 * | 6/2001 | Davis | 280/290 |
| 6,907,952 | B2 | 6/2005 | Jones | |
| 7,255,360 | B2 * | 8/2007 | Bever | 280/290 |
| 8,011,725 | B2 * | 9/2011 | Andrews | 297/215.12 |

OTHER PUBLICATIONS flicker.com "Raleigh Chopper Backrest" accessed on Apr. 21, 2010, www.flickr.com/photos/61349419@N00/2516856796.

* cited by examiner

*Primary Examiner* — Paul N Dickson
*Assistant Examiner* — Wesley Potter
(74) *Attorney, Agent, or Firm* — Dwayne E. Rogge; Schacht Law Office, Inc.

(57) ABSTRACT

Disclosed herein is a bicycle thrust apparatus coupled to a bicycle having: a frame, a front wheel having a front wheel axle coupled to a forward portion of the frame, a rear wheel having a rear wheel axle coupled to a rearward portion of the frame, a seat attached to the frame via a seat post. A thrust brace having a lower portion coupled to the frame adjacent the rear wheel axle is also disclosed wherein the thrust brace comprises an upper portion telescopically coupled to the lower portion such as to provide adjustability to the vertical and horizontal dimensions of the thrust apparatus. A cushioned back engagement pad may be utilized pivotably coupled to the upper portion of the thrust brace; and a cross member interconnecting the thrust brace and the bicycle frame at a location vertically above, and horizontally forward of the rear wheel axle.

9 Claims, 5 Drawing Sheets

_US 8,668,219 B1_

BICYCLE THRUST APPARATUS

RELATED APPLICATIONS

This application claims priority benefit of U.S. Ser. No. 61/360,765, filed Jul. 1, 2010 incorporated herein by reference.

BACKGROUND OF THE DISCLOSURE a) Field of the Disclosure

This disclosure relates to the field of braces and back supports for bicycles and other pedal-powered vehicles.

BRIEF SUMMARY OF THE DISCLOSURE

A bicycle thrust apparatus is disclosed herein comprising a bicycle having; a frame, a front wheel having a front wheel axle coupled to a forward portion of the frame, a rear wheel having a rear wheel axle coupled to a rearward portion of the frame, and a seat attached to the frame via a seat post. The thrust apparatus also comprises a thrust brace, wherein the thrust brace comprises a lower portion coupled to the frame adjacent the rear wheel axle. The thrust brace in one form comprises an upper portion telescopically coupled to the lower portion, such as to provide adjustability to the vertical and horizontal dimensions of the thrust apparatus. The thrust apparatus may also include a back engagement pad pivotably coupled to the upper portion of the thrust brace; and a lateral brace interconnecting the thrust brace and the bicycle frame at a location vertically above, and horizontally forward of the rear wheel axle. In one form the lateral brace is coupled to a seat post of the bicycle and in another form the lateral brace is coupled to at least one chain stay of the bicycle.

The thrust apparatus may be arranged wherein the lower portion of the thrust brace is coupled to the lateral brace.

The thrust apparatus could utilize a lateral brace which is comprised of a plurality of telescoping components.

The thrust apparatus may be assembled wherein a line connecting the back engagement pad, and a drive pedal of the bicycle passes through a force triangle formed by a user's heel, knee, and center of hip rotation.

The thrust apparatus may be configured wherein the back engagement pad is vertically above a seat of the bicycle.

In one form the thrust brace is curvilinear, while in another form the thrust brace comprises a plurality of linear portions.

DETAILED DESCRIPTION OF THE DISCLOSURE

Figure 1:
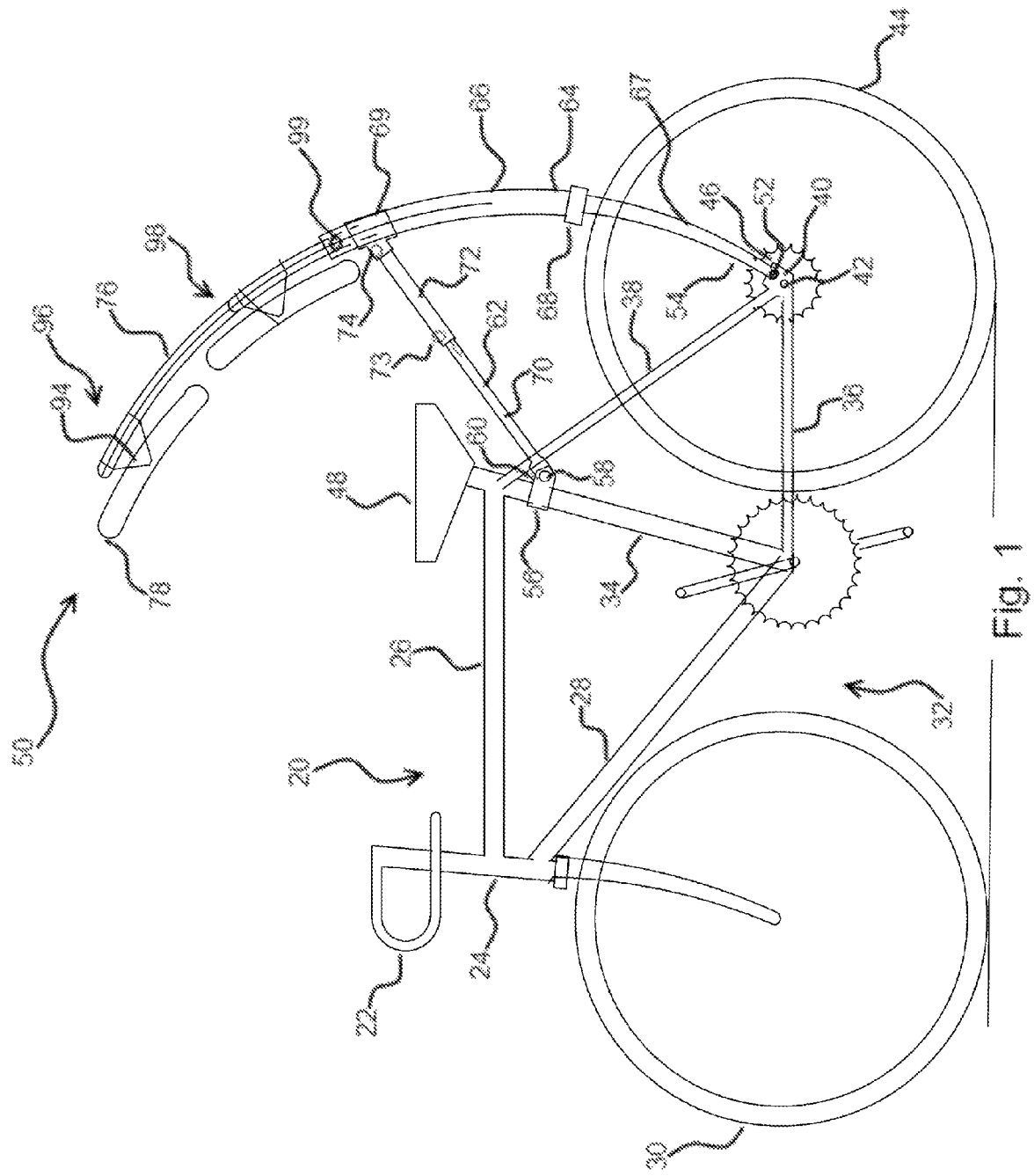
FIG. 1 is a side view of one embodiment of the disclosure.

In the sport and recreation of bicycle riding, it often occurs that a user would desire to exert more pressure downward upon the petals of the bicycle or equivalent than is possible given the user's own weight. Several different techniques have been incorporated into bicycles to accomplish this. The most common technique is to apply "cages" to the upper portion of the petals, which serve the dual function of allowing the user to maintain their footing on the panel more easily, and also allowing for upward force to be exerted upon the crank arm as that portion of the thrust mechanism is in its upward rotation. Less common techniques are bicycle body supports or braces, such as found in U.S. Pat. No. 6,206,399 or U.S. Pat. No. 553,722. While these prior inventions slightly improved a user's comfort, they were generally unsatisfactory in supporting an active user, as will be shown by an understanding of the embodiments disclosed herein and their comparison to the prior art.

While there is a common set of terminology regarding bicycles and equivalents, the following terms will be utilized to define particular elements of most bicycles to aid in clarity of understanding of this disclosure wherein the terminology may not be clear globally. In this disclosure, the term bicycle is meant to incorporate personal powered vehicles having at least two wheels, but in some embodiments having three, four or more wheels. For example, the bicycle 20 shown in FIG. 1 generally comprises handlebars 22 rotatably attached to a head tube 24, which is fixedly attached to a top tube 26 and down tube 28. The handlebars 22, in conjunction with the head tube 24, allow for driving and steering of the bicycle as they rotate the front wheel 30 relative to the remainder of the frame 32. The frame 32 in one form comprises the head tube 24, top tube 26, down tube 28, seat post 34, a plurality of chain stays 36 on opposite lateral sides of the rear wheel 44, and a plurality of seat stays 38 also on opposite lateral sides of the rear wheel. The portion where each seat stay 38 is fixedly coupled to the associated chain stay 36 is generally called a dropout 40, as the rear axle 42 is generally configured to "drop out" of this device for repair or removal of the rear wheel 44 and in most instances the rear sprocket 46. To aid in comfort to the user, a seat or saddle 48 is fixedly and positionably attached to the seat post 34, generally to allow rotation or elevation of the saddle 48 relative to the frame 32 to adjust for users of different inseam lengths, as is well known to one of ordinary skill in the art.

Figure 3:
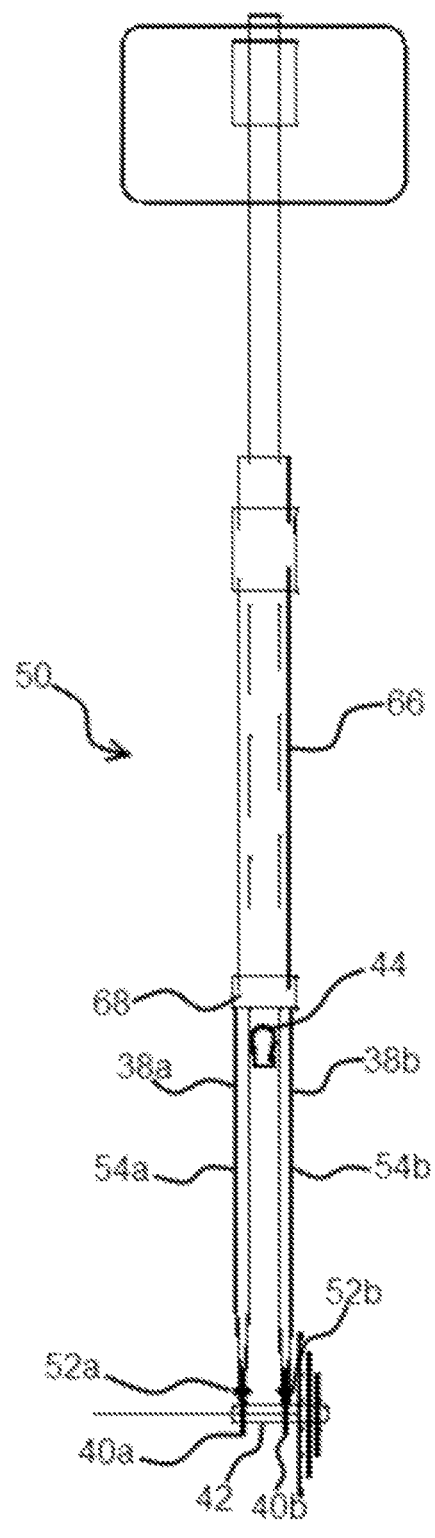
FIG. 3 is a rear view of several components of the embodiment shown in FIG. 1.

The prior art patent references shown above suffered from several shortcomings, one of which being the single point attachment between the back support and the frame 32 of the bicycle 20. Thus, an improved thrust brace 50 is disclosed, having a plurality of attachment points to the frame 32. In the embodiment shown in FIG. 1, the first set of attachment points is a fastener 52 connecting the lower end 54 of the thrust brace 50 to the dropouts 40. Looking to FIG. 3, it can be seen how the seat stays 38 in one form terminate in a plurality of dropouts 40 on either side of the rear axle 42. In this disclosure, an alphanumeric labeling system will be utilized, wherein a numeric prefix generally denotes a group of elements, and where present, an alpha suffix denotes particular elements within that group. For example, the seat stays are labeled 38, while the left seat stay is labeled 38a and the right seat stay is labeled 38b. Additionally, dropouts 40a and 40b, as well as lower portions 54a and 54b of the thrust brace 50, are shown in FIG. 3. The fasteners 52a and 52b could be welds, screws, rivets or bolts, although it is suspected that removable fasteners such as self-tapping screws or bolts would be most commonly used. The thrust brace 50 is also coupled to the frame 32 at a second point, at a distance from the axis of rotation of the fasteners 52, in one form via the seat post 34. As shown in FIG. 1, a post bracket 56 may be provided, such as is well known in the art, to frictionally engage the outer surface of the seat post 34 by way of a tensioning fastener 58. Of course, the post bracket 56 could alternatively be fixed to the frame 32 by way of welds or other methods. In one form, the fastener 58 also functions as a pivot 60 between the post bracket 56 and a lateral brace 62 extending from the seat post 34 to a vertical brace 64. the lateral brace 62 and vertical brace 64 form two portions of the thrust brace 50. Thus, a triangle is formed by the lateral brace 62, seat stay 38, and vertical brace 64, which would add substantial rigidity and support to the thrust brace 50 and would tend to provide much more support against rotation and bending than the prior art patent references listed above, among others. In one form, the vertical brace 64 comprises a lower portion which may be an outer sleeve 66 terminating at its lower portion at a coupling 68, where a plurality of fork-like extensions 67 connect on either side of the rear wheel 44 between the coupling 68 and the dropouts 40. Alternatively, the extension 67 could extend only on one side of the rear wheel 44 and directly couple only on one side to a singular dropout 40.

In one form, the lateral brace 62, extending between the post bracket 56 and vertical brace 64, comprises a lower portion 70 and an upper portion 72 with longitudinal adjustment therebetween. In one form, the lower portion 70 may be configured to extend in a telescoping manner into the upper portion 72 and lock in position once the proper adjustment is established by way of a locking mechanism 73. Additionally, a pivot 74 may be provided at the brace bracket 69 between the lateral brace 62 and vertical brace 64.

Figure 4:
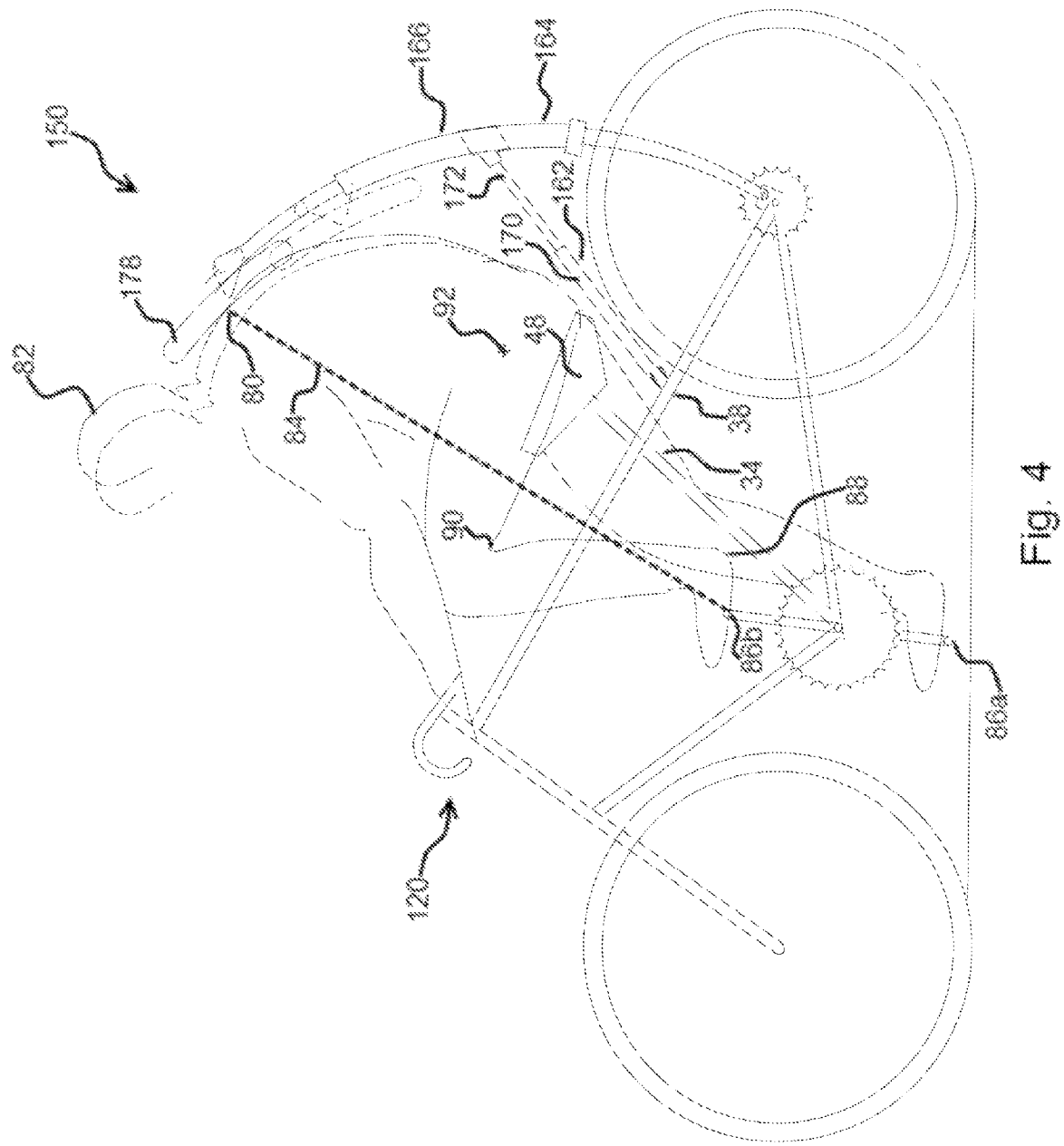
FIG. 4 is a side view of a user operating an embodiment of the disclosure similar to that shown in FIG. 1.

The thrust brace 50 in one form further comprises an upper portion 76 extending vertically above the vertical brace 64 and coupled to a back engagement pad 78. As can be seen in FIG. 4, the back pad 78 is in contact with the user's back at a contact point 80. Thus, the user 82 can exert force therebetween in excess of the weight of the user in a manner previously described. As can be seen in FIG. 4, a line 84, connecting the drive pedal 86*b* and the contact point 80, passes through a force triangle formed by the user's heel 88, knee 90, and the center of the hip joint generally at 92. As this force triangle extends when the user exerts force forward and downward on the drive pedal 86*b*, the alignment of this line 84 through the force triangle substantially increases the force which a user can exert upon the drive pedal 86*b*. The drive pedal 86*b* would then rotate about the sprocket and become a following pedal 86*a*.

In one form, as shown in FIG. 1, the back pad 78 is coupled to the upper portion 76 of the thrust brace 50 through a pivot 94, which may be tensioned to prohibit free rotation once the proper adjustment has been made to the angle of the back pad 78 relative to the upper portion 76, or may be allowed to freely rotate through a defined angle.

Additionally, in one form, the upper portion 76 may be positionably attached to the lower portion 66 to adjust the back pad 78 from an upper position 96 to a lower position 98, and alternatively to discrete or continuous positions therebetween. In one form, the upper portion 76 is configured with an outer surface slightly smaller than the inner surface of the outer sleeve 66 to fit therein, with a locking mechanism 99 also provided to firmly position the back pad 78 once the proper vertical/longitudinal positioning is established. This arrangement would also allow the back engagement pad 78 to be repositioned to the lower position 98 when it is no longer desired for an increase in thrust, such as when the user desires to sit more upright for comfort.

Figure 2:
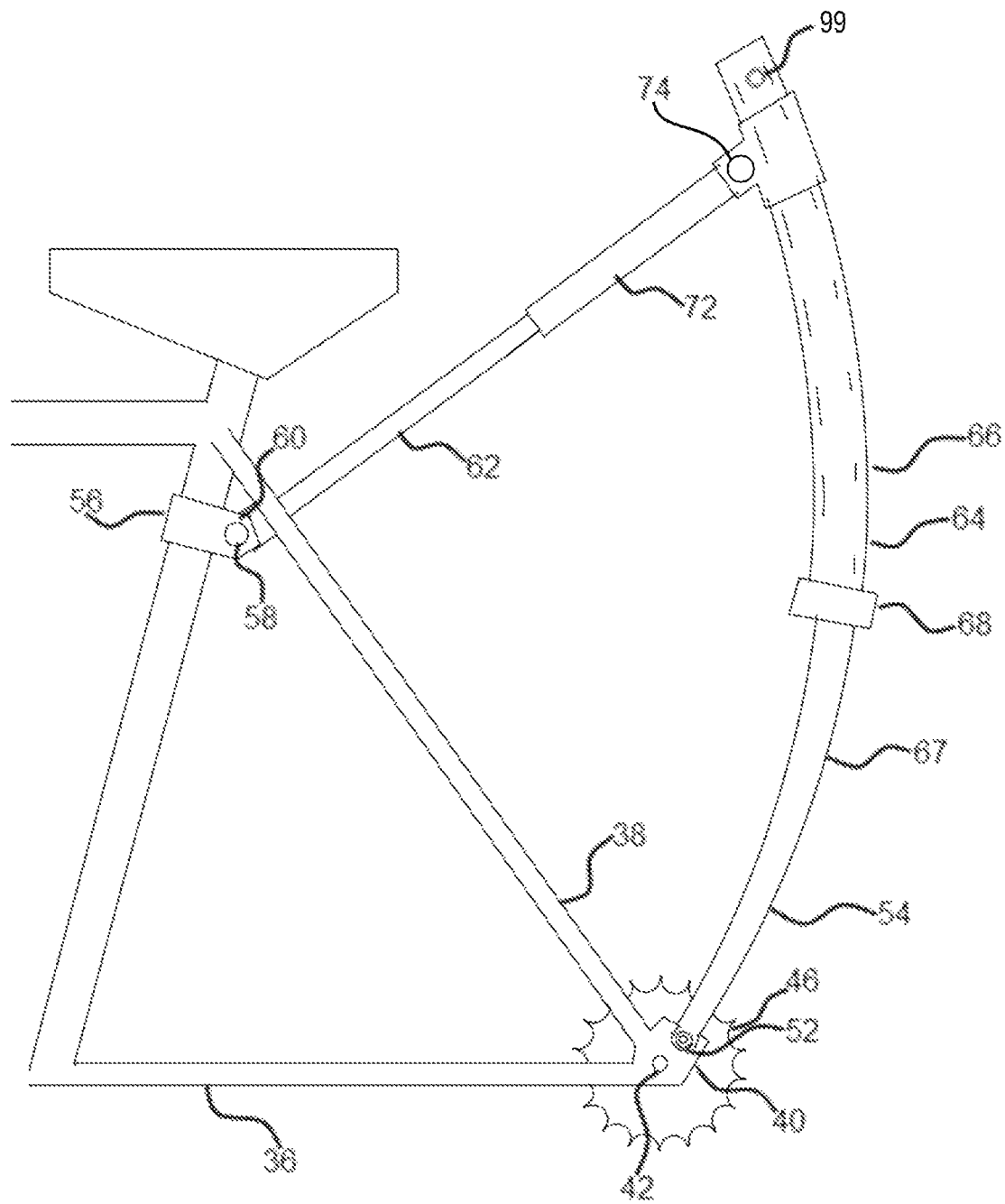
FIG. 2 is a detail view of several components of the embodiment shown in FIG. 1.

While the embodiment shown in FIGS. 1-3 shows a thrust brace 50 attached directly to the seat post 34 at a post bracket 56, the embodiment shown in FIG. 4 comprises a similar lateral brace 162 having an upper portion 172 attached to the lower portion 166 of the vertical brace 164 and a lower portion 170 coupled to the seat stay 38 of the bicycle 120. Where possible, this embodiment utilizes the same numbers as the previous embodiment, with a numeral 1 prefix. For example the engagement pad is numbered 178. The thrust brace 150 is therefore coupled to the seat post 34 via the seat stay 38. The remainder of the structures are substantially the same as the previous embodiments and function in the same way.

Figure 5:
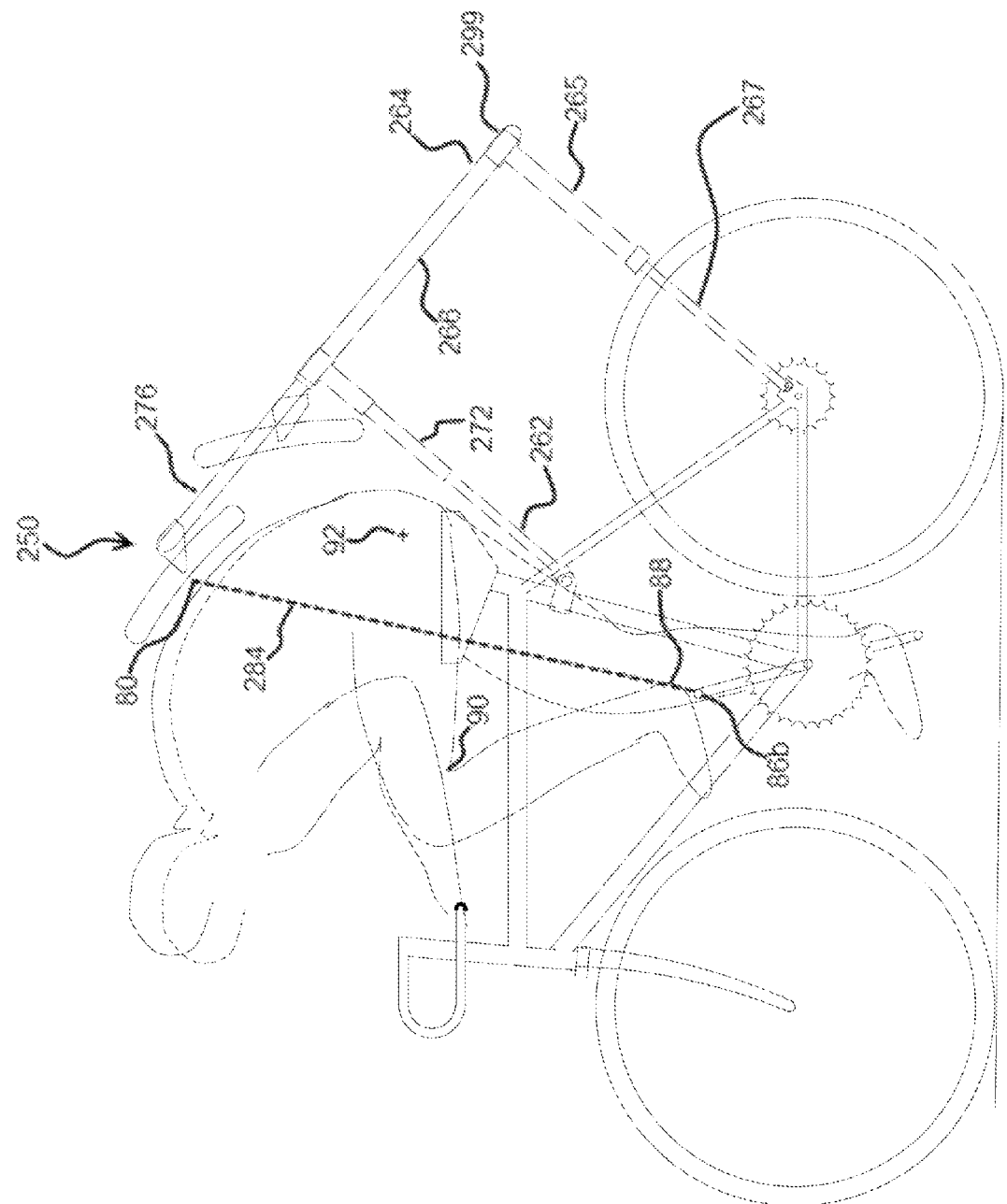
FIG. 5 is a side view of a user operating an embodiment of the disclosure similar to that shown in FIG. 1.

FIG. 5 shows an embodiment wherein the vertical brace 264 comprises a lower fork 265 which is part of a lower portion 266 attached thereto at a coupling 299, which form an equivalent structure to the lower portion 66 of the first embodiment. Where possible, this embodiment utilizes the same numbers as the previous embodiment, with a numeral 2 prefix. For example thrust brace 250, lateral brace 262, extensions 267, and upper portion 272 bear similarity to their similarly labeled counterparts in previous examples. In another embodiment, (not shown) the lower fork 265 and the lower portion 266 are a unitary structure. In this embodiment, the lower portion 266 and upper portion 276 are linear but function in the same manner as the embodiment shown in FIG. 1.

In the embodiment shown in FIG. 5, a line 284 is shown passing through the contact point 80 and the drive pedal 86*b*. As previously described, this line 284 passes through the force triangle formed by the user's heel 88, knee 90, and center of hip rotation 92 for reasons previously discussed. In one form, the thrust brace 50 may be provided as an accessory option configured to attach to multiple different bicycle designs by adjustment pivots and/or extensions. Additionally, the upper portion 76 and lower portion 66 may be formed of two comprising shapes, such as circles, ovals, squares, t-channel, or functional equivalents.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A bicycle thrust apparatus comprising;
    a. a bicycle having;
        i. a frame,
        ii. a front wheel having a front wheel axle coupled to a forward portion of the frame,
        iii. a rear wheel having a rear wheel axle coupled to a rearward portion of the frame,
        iv. a seat attached to the frame via a seat post;
    b. a thrust brace;
    c. wherein the thrust brace comprises a lower portion coupled to the frame adjacent the rear wheel axle;
    d. wherein the thrust brace comprises an upper portion telescopically coupled to the lower portion, to provide adjustability to the vertical and horizontal dimensions of the thrust apparatus;
    e. a back engagement pad pivotably coupled to the upper portion of the thrust brace;
    f. a lateral brace interconnecting the thrust brace and the bicycle frame at a location vertically above, and horizontally forward of the rear wheel axle; and
    g. wherein the upper portion and the lower portion form a telescoping portion which extends from a point above the connection between the lateral brace and the thrust brace to a point below the connection between the lateral brace and the thrust brace lateral brace.

2. The bicycle thrust apparatus as recited in claim 1 wherein the lower portion of the thrust brace is coupled to the lateral brace.

3. The bicycle thrust apparatus as recited in claim 1 wherein the lateral brace is comprised of a plurality of telescoping components.

4. The bicycle thrust apparatus as recited in claim 1 wherein the lateral brace is coupled to the seat post of the bicycle.

5. The bicycle thrust apparatus as recited in claim 1 wherein the lateral brace is coupled to at least one seat stay of the bicycle.

6. The bicycle thrust apparatus as recited in claim 1 wherein the back engagement pad is vertically above the seat of the bicycle.

7. The bicycle thrust apparatus as recited in claim 1 wherein the thrust brace is curvilinear.

8. The bicycle thrust apparatus as recited in claim 1 wherein the thrust brace comprises a plurality of linear portions.

9. A bicycle thrust apparatus comprising;
 a. a bicycle having;
  i. a frame,
  ii. a front wheel having a front wheel axle coupled to a forward portion of the frame,
  iii. a rear wheel having a rear wheel axle coupled to a rearward portion of the frame,
  iv. a plurality of dropouts at the attachment of a chain stay to a seat stay;
  v. a seat attached to the frame via a seat post;
 b. a thrust brace;
 c. wherein the thrust brace comprises a lower portion coupled to the frame at each of the dropouts;
 d. wherein the thrust brace comprises an upper portion telescopically coupled to the lower portion, such as to provide adjustability to the vertical and horizontal dimensions of the thrust apparatus;
 e. a back engagement pad pivotably coupled to the upper portion of the thrust brace;
 f. wherein the upper portion and the lower portion form a telescoping arc from the point at which the lower portion attaches to the frame to the back engagement pad; and
 g. a lateral brace interconnecting the thrust brace and the bicycle frame at a location vertically above, and horizontally forward of the rear wheel axle.

\* \* \* \* \*